United States Patent
Bowron et al.

[11] Patent Number: 5,860,721
[45] Date of Patent: Jan. 19, 1999

[54] OPTICAL RESIZING APPARATUS

[75] Inventors: John William Bowron, Kitchener; Terrence Carl Schmidt, Wellesley, both of Canada

[73] Assignee: Electrohome Limited, Kitchener, Canada

[21] Appl. No.: 871,336
[22] Filed: Jun. 9, 1997
[51] Int. Cl.[6] .................................. G03B 21/14
[52] U.S. Cl. .............................. 353/101; 353/30
[58] Field of Search ............... 353/122, 69, 101, 353/38, 102; 348/441, 445, 913; 349/5, 7

[56] References Cited

U.S. PATENT DOCUMENTS

| | | | |
|---|---|---|---|
| 5,200,815 | 4/1993 | Tsujihara . | |
| 5,355,328 | 10/1994 | Arbeiter | 364/445 |
| 5,386,252 | 1/1995 | Oku | 348/751 |
| 5,459,532 | 10/1995 | Babe | 348/345 |
| 5,475,447 | 12/1995 | Funado | 348/745 |
| 5,483,299 | 1/1996 | Minoura | 348/745 |
| 5,489,952 | 2/1996 | Gove et al. | 348/445 |
| 5,499,061 | 3/1996 | Oku | 348/746 |
| 5,500,692 | 3/1996 | Onozuka | 348/759 |
| 5,521,658 | 5/1996 | Donohe | 353/98 |
| 5,669,686 | 9/1997 | Moon | 353/98 |
| 5,673,086 | 9/1997 | Fukuoka et al. | 348/445 |

*Primary Examiner*—William C. Dowling
*Attorney, Agent, or Firm*—Knobbe, Martens, Olson & Berry, LLP

[57] ABSTRACT

A pixellated light valve projector with optical image resizing, comprising: a) a lamp and optical integrator for generating a rectangular beam of light according to a predetermined aspect ratio; b) a pixellated panel for generating a rectangular image of a video signal in any one of a plurality of native pixel formats; c) a relay optical system intermediate the optical integrator and the pixellated panel for automatically concentrating the light onto the image in accordance with the one of the plurality of native pixel formats; d) a projection screen; and e) a projection lens for projecting the image onto the projection screen so that the projected image fills the projection screen in accordance with the one of the plurality of native pixel formats while image brightness level is maintained by concentrating the light onto the image on the pixellated panel.

15 Claims, 3 Drawing Sheets

OPTICAL RESIZING APPARATUS

FIELD OF THE INVENTION

The present invention relates in general to video projection systems, and more particularly to an optical resizing apparatus for LCD and other pixellated light valve projectors.

BACKGROUND OF THE INVENTION

The popularity of LCD and other pixellated light valve projectors is increasing as a replacement to traditional CRT projection systems because of their smaller size and lighter weight. In the future, it is also expected that pixellated light valve projectors will become less expensive to manufacture than traditional CRT projectors.

One problem inherent in the new crop of LCD and other pixellated light valve projectors is that the number of displayable pixels often does not correspond to the same number of pixels in the original signal source. This can result, for example, when a pixellated panel designed according to one of the common standards (e.g. SVGA having 800×600 pixels) is used to display a signal generated according to a different standard (e.g. VGA having 640×480 pixels). Prior art traditional CRT projection systems are format flexible with multi-sync operation, due to their analog design. Such systems can display optimized images with any number of pixels per line and variable number of lines per frame.

In order to match signal resolution to a native fixed pixel format of the pixellated panel in an LCD or other pixellated light valve projector, there are three options currently being practiced. The first option is to create a black border around the image by simply projecting the underscanned pixellated display panel. The second option is to electronically "resize" the image to fully utilize the panel area. The third option is to "window" or show only a small portion of the complete picture thereby sacrificing portions of the picture to accommodate the display size.

A fundamental disadvantage of the first option is that the full display surface of the panel and projection screen in underutilized, and the total brightness of the image is reduced. According to the second option, the digital resizing engine is required to "invent" information by computational interpolation to fill blank pixels in the resized image (e.g. expanding 640 pixels onto a line of 800 pixels). The circuitry required is expensive and can result in defocussing (or aliasing) artifacts due to the uncertainties inherent in the interpolation calculations. An example of a "resizing engine" according to the second option, is set forth in U.S. Pat. No. 5,355,328 (Arbeiter et al).

Several prior art patents have issued relating generally to the field of projection systems with image compression and expansion.

U.S. Pat. No. 5,500,692 discloses an image projecting apparatus which uses micro-lenses and mechanical adjustment of the optical axis to eliminate keystoning.

U.S. Pat. Nos. 5,386,252 and 5,499,062 disclose a projection system including means for compressing and expanding the aspect ratio of a picture. These two patents address the problem of projecting a picture whose vertical length is different from its horizontal length, whereby upon projection, the source image generated on the face plate panel of the projection CRT becomes oblong. Picture compression apparatus is disclosed in these two patents for distorting the original image so that the aspect ratio of the picture as applied to the CRT (or LCD panel) becomes one (i.e. it is square). The inventions described in these two patents are said to improve luminance and contrast of the magnified picture projected onto a screen when the original image size has an aspect ratio other than one.

U.S. Pat. No. 5,489,952 discloses a digital scaling device to accommodate different broadcast standards utilizing interpolation means to format data for a number of standardized—format video broadcast signals and to eliminate artifacts.

U.S. Pat. No. 5,483,299 discloses an automatic projection zoom based on measured distance between the projector and the screen. Distance measuring is used to control zoom of the projection lens and is also used to drive a picture quality correction circuit for adjusting luminance, contrast, edge emphasis, etc., in accordance with the distance between the projector and the screen.

U.S. Pat. No. 5,459,532 discloses an automatic focus adjuster for projection display systems wherein a range measuring device is used for measuring the distance between the projection lens and a screen via infrared light, and automatic adjustment elements are used to adjust the focal point of the projection lens system to an optimum focal point or position based on the measured distance. The system functions automatically each time the projection display is moved or repositioned.

U.S. Pat. No. 5,475,447 relates to an automatic digital convergence system including a pattern generator for generating pattern video signals to drive RGB tubes, and a TV camera which takes pictures of the screen. These pictures are digitized via an A/D converter, stored in a frame memory and then processed via a CPU for automatic registration adjustment in relation to each beam.

U.S. Pat. No. 5,200,815 is similar to the '447 patent in that it deals with the problem of automatic convergence correction of projected color images. The invention relates to a system for calculating converging angles of individual projector tubes and automatically determining correction data for deflection linearity, luminance and focusing.

None of the above-discussed prior art patents provide any description of a solution to the problem of optical resizing in pixellated panel projection systems.

SUMMARY OF THE INVENTION

According to the present invention, image resizing is provided in an LCD or other pixellated light valve projector systems where the number of displayable pixels does not correspond to the number of pixels in the original signal source. Rather than simply underscanning the display panel and leaving a black border around the unutilized area, or utilizing expensive DSP resizing engines, the present invention relies on the integer relationship that exists between the signal pixel count and the display mapping to display the original signal in native pixel format. According to the present invention, the projection optics are automatically zoomed in order to fill the projection screen to its full size, and the illumination system optics are simultaneously zoomed to concentrate all of the source light onto the centre pixels, which, as indicated above, are displayed on the panel in native format (i.e. 1:1, 1:2, etc. mapping).

BRIEF DESCRIPTION OF THE DRAWINGS

A detailed description of the preferred embodiment is provided herein below with reference to the following drawings, in which.

DETAILED DESCRIPTION OF THE INVENTION

Figure 1:
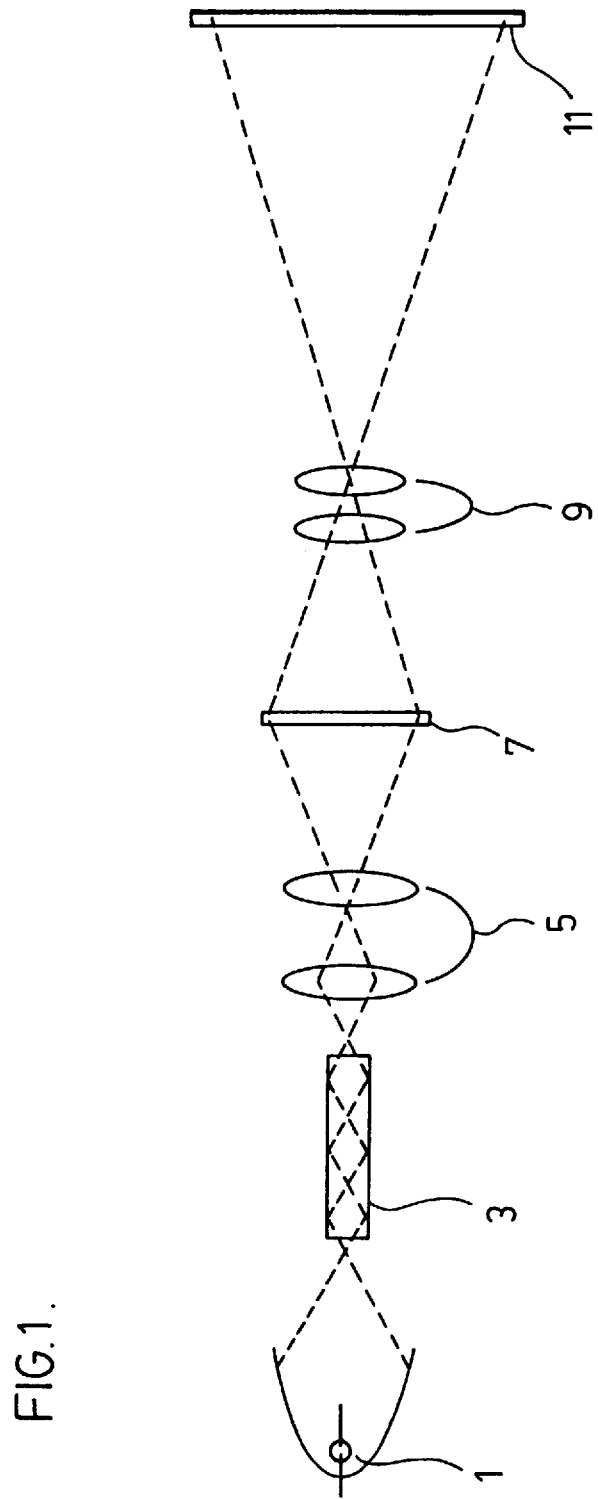
FIG. 1 is a schematic illustration of a projection system having predetermined panel resolution sufficient to support many pixel formats.

Turning to FIG. 1, a projection system is shown schematically comprising a lamp 1, optical integrator 3, relay optical system 5, pixellated panel 7, projection optical system 9 having focus and zoom lenses, and projection screen 11. For example, where the LCD or other pixellated panel 7 corresponds to SVGA (800×600 pixels) standard, then 800 pixels fill each of the 600 lines of the panel. In order to display a signal generated according to VGA standard (i.e. 640×480 pixels), according to the prior art, each 640 pixel line is mapped to the centre 640 pixels of the 800 pixel-per-line SVGA panel 7, leaving a black border of 80 lines and 60 columns (left and right) resulting in a smaller (top and bottom) image at screen 11. Alternatively, where an expensive DSP (Digital Signal Processing) image resizing engine is utilized, the native VGA signal is resized to SVGA format utilizing interpolation methods so as to fill the entire panel 7, resulting in aliasing artifacts.

Figure 2:
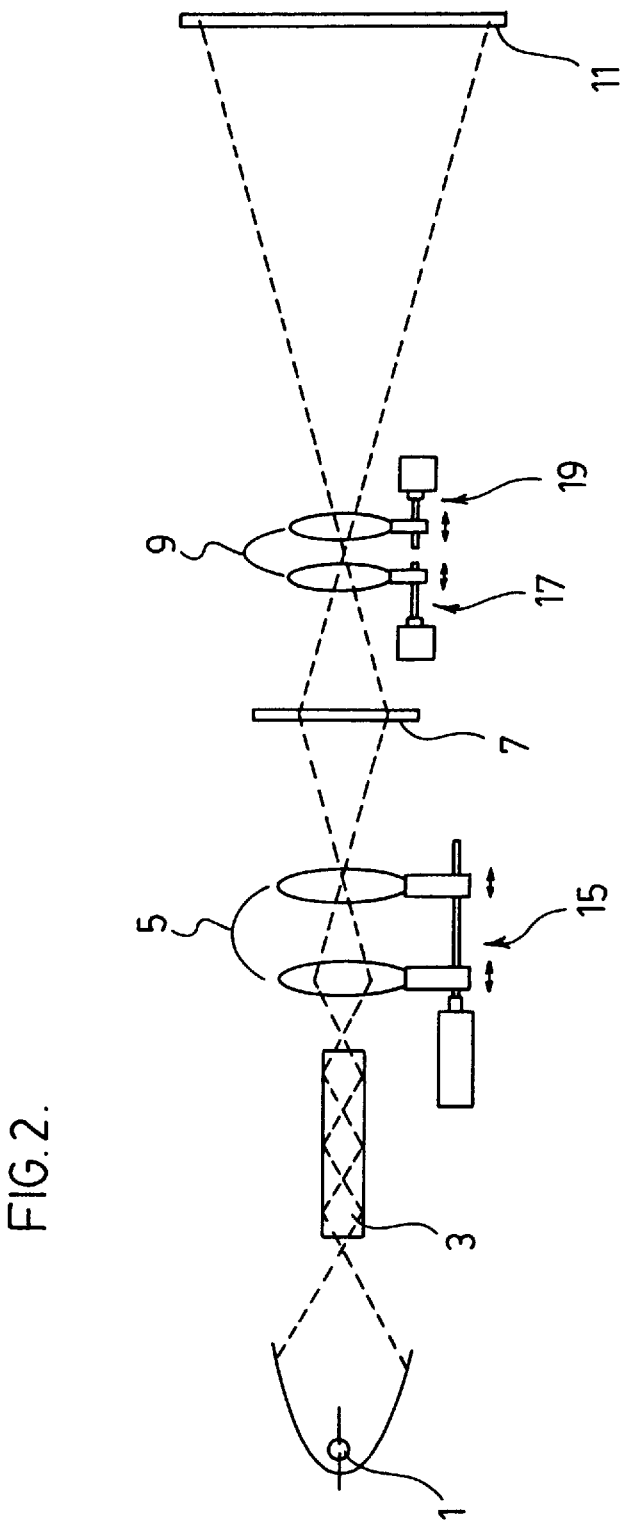
FIG. 2 shows the projection system of FIG. 1 wherein the projection lens and relay lens focal lengths have been adjusted according to the present invention to match signal resolution to a native fixed pixel format.

According to the present invention, as shown in FIG. 2, the projection lens optical system 9 is automatically zoomed via projection zoom servo 19 so that the image fills the entire screen 11, and simultaneously, the relay optical system 5 is automatically zoomed via illumination zoom servo 15 to concentrate all of the light into the center 640 pixels×480 pixels of panel 7, to maintain the image brightness level. Projection lens focus servo 17 is provided to maintain sharp image focus over the optical zoom range as may be required, depending on the tracking ability of the zoom lens design.

Thus, according to the present invention, the image is displayed on the panel 7 in its "native" format (i.e. a 1:1 or 1:2 mapping), to preserve the best image quality without resorting to expensive "resizing engines" which suffer from the defocussing effects discussed above. The image is automatically resized by the projection optical system 9 under microprocessor control of servos 17 and 19, as discussed in greater detail below with reference to FIG. 3, to project the same size image and fill the same screen as would have been filled by a full image on panel 7. Since only a portion of the full panel size is being projected onto the screen (FIG. 2), the illumination that is present around the dark border extends beyond the dimensions of the screen 11. Therefore, according to the present invention, the relay optical system 5 is also zoomed under microprocessor control of servo 15 to compensate and concentrate the illumination into only the portion of the panel 7 on which the image is generated.

Since, according to the present invention, optical resizing results from undersampling the full panel 7, the panel must be chosen to have sufficient resolution to support resizing to smaller formats. A list of common computer standards and their pixel formats is provided in Table 1, below.

TABLE 1

| Standard | Pixel Format | Aspect Ratio |
| --- | --- | --- |
| VGA | 640 × 480 | 4:3 |
| SVGA | 800 × 600 | 4:3 |
| XGA | 1024 × 768 | 4:3 |
| EWS(SXGA) | 1280 × 1024 | 5:4 |

The preferred embodiment, using an EWS panel exhibits the resolutions and relative areas of pixels used, as shown in Table 2.

TABLE 2

| Signal | Pixels Used on EWS Panel | Relative Number of Pixels Used |
| --- | --- | --- |
| SVGA | 800 × 600 | 62.5% × 58.6% |
| XGA | 1024 × 768 | 80% × 75% |
| VGA | 1280 × 960 (doubled VGA) | 100% × 93.8% |
| NTSC video | 1280 × 1024 (see note 1) | 100% × 100% |
| EWS | 1280 × 1024 | 100% × 100% |

Note 1: 525 video lines are doubled to 1050 lines, 13 video blanking lines are dropped to get 1024 lines.

According to the preferred embodiment, the output of the integrator 3 is imaged directly onto the panel 7 (e.g. Abbé illumination scheme) via the relay lens optical system 5. The relative panel area specifies the portion of the panel 7 to be illuminated and therefore fixes the magnification of the relay optical system 5. Since some formats have 4:3 aspect ratio and others have 5:4 aspect ratio, assuming square pixels, it is not possible to exactly match all illuminated areas with active pixels, using a single integrator 3. It is possible to choose an integrator having an aspect ratio according to the "narrowest" format, or the "widest" format, or a compromise aspect ratio between the two extremes. According to a successful prototype of the invention, an integrator with $\sqrt{5}:\sqrt{3}$ aspect ratio was chosen. Table 3 shows the match between various integrator sizes to the 4:3 and 5:4 format pictures.

TABLE 3

| Integrator Aspect Ratio | Matched to 4:3 | Matched to 5:4 |
| --- | --- | --- |
| 4:3 | 0% overfill | 6.7% overfill |
| 5:4 | 6.7% overfill | 0% overfill |
| $\sqrt{5}:\sqrt{3}$ | 3% overfill | 3% overfill |

After choosing the integrator aspect ratio (e.g. $\sqrt{5}:\sqrt{3}$), the actual size of the integrator 3 is determined from the choice of lamp, panel f/# and panel size, as discussed in greater detail below. The illumination system is limited by the etendu of the lamp 1. To ensure maximum light efficiency, the lamp etendu should be matched to the smallest region of the panel to be illuminated (e.g. SVGA in the preferred embodiment). This is done in accordance with the following equation to set the magnification for the smallest illumination region:

$$M_{svga} = \frac{f/\text{panel}}{f/\text{lamp}}$$

where f/lamp is the f/# of the lamp/reflector combination, and f/panel is the minimum f/# for the illumination on the panel 7 as determined by the projection lens. This magnification fixes the size of the integrator 3. The relay magnification is increased to illuminate larger regions of the panel 7, but the minimum f/panel condition is maintained. Table 4 shows the relative magnifications for a minimum f/#=3.0 illumination, with a preferred minimum size SVGA panel.

TABLE 4

| Signal | Pixels Used on EWS Panel | Relay Magnification | f/# |
|---|---|---|---|
| SVGA | 800 × 600 | $M_{svga} = \frac{f/panel}{f/lamp}$ | 3.0 |
| XGA | 1024 × 768 | $M_{svga}$*128% | 3.8 |
| VGA | 1280 × 960 | $M_{svga}$*160% | 4.8 |
| NTSC video | 1280 × 1024 | $M_{svga}$*165% (see note 2) | 5.0 |
| EWS | 1280 × 1024 | $M_{svga}$*165% | 5.0 |

Note 2: Magnification scales to width for 4:3 aspect ratios. Magnification scales to height for 5:4 aspect ratios.

The magnification for the projection optical system 9 is chosen such that when the user switches input signals, the panel 7 is driven at the native resolution of the signal with illumination matched to the panel size to obtain maximum brightness, and the "zoom" of the projection optical system 9 is adjusted to maintain a constant picture dimension. For example, if the picture format changes from 4:3 to 5:4, it is not possible to maintain a constant picture size. Thus, according to a successful prototype of the invention, adjustment is made to maintain constant picture width.

The projection lens magnification is given by $M'=W/P$, where W is the screen width of screen 11 and P is the effective width of panel 7. Table 5 shows the projection lens magnification for each signal with a preferred SVGA panel illumination.

TABLE 5

| Signal | Pixels Used on EWS Panel | Proj. Lens Magnification |
|---|---|---|
| SVGA | 800 × 600 | $M'_{svga} = \frac{W}{P_{svga}}$ |
| XGA | 1024 × 768 | $M'_{svga}$*78.1% |
| VGA | 1280 × 960 | $M'_{svga}$*62.5% |
| NTSC video | 1280 × 1024 | $M'_{svga}$*62.5% |
| EWS | 1280 × 1024 | $M'_{svga}$*62.5% |

Figure 3:
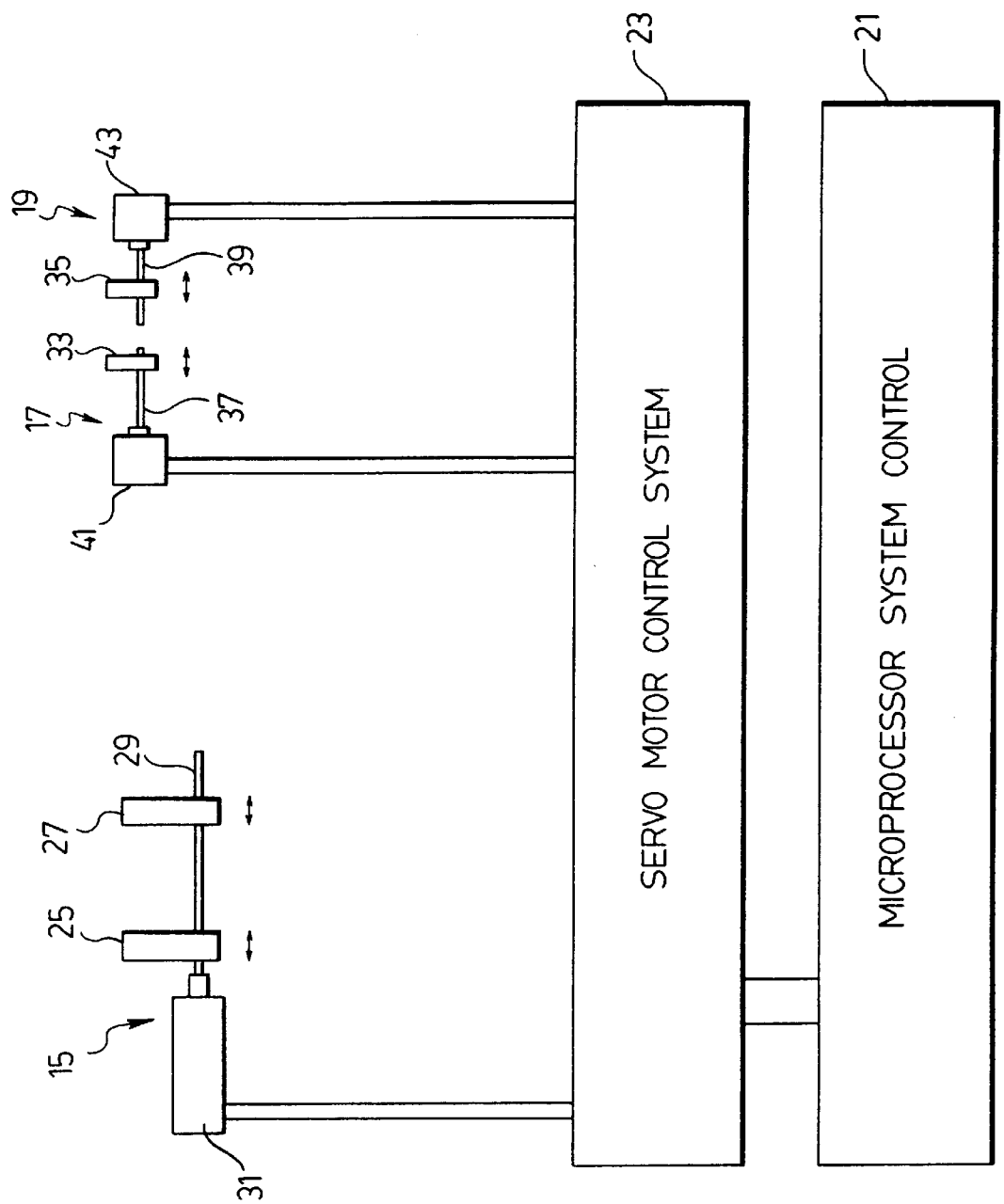
FIG. 3 is a block diagram of an optical resizing apparatus according to the preferred embodiment.

Turning to FIG. 3, an optical resizing apparatus is shown according to the preferred embodiment comprising a microprocessor 21 for controlling a servo motor control system 23 which, in turn, is connected to servos 15, 17 and 19. The microprocessor 21 includes appropriate interface circuitry and software for detecting the input signal format, (e.g. VGA, SVGA, XGA, EWS, etc.), all of which are well known in the art. Illumination zoom servo 15 includes a pair of lens holders 25 and 27 mounted to a threaded rotating shaft 29 which turns under precision control of servo motor 31 to move the lenses forming optical system 5. Although the relay optical system 5 is shown comprising a pair of lenses which are adapted to move in unison under control of illumination zoom servo 15, the relay optical system may be replaced by a suitable alternative optical system (e.g. mirrors, etc.). In a similar manner, the focus and zoom lenses of the projection optical system 9 of the preferred embodiment are zoomed via respective lens holder 33 and 35 mounted to respective shafts 37 and 39 which turn under precision control of servo motors 41 and 43, respectively.

The operative principles of the present invention will be better understood with reference to the following numerical example.

For a 1280×1024 pixel (EWS 1.3 inch diagonal) panel 7, the limiting image size is 16.0 mm×12.0 mm. Given a Xenon lamp 1 and associate reflector design with an f#=1.3 light cone, and a projection optical system 9, (lens, dichroic cube etc.) which dictates that the panel illumination light cone be f#=3.0, then the magnification ratio is $$\frac{f/panel}{f/lamp} = 3.0/1.3 = 2.308 = M_{SVGA}$$

The size of the integrator 3 is influenced by manufacturing tolerances and aspect ratio mismatches. As discussed above, for an aspect ratio for integrator 3 of $$\sqrt{5} : \sqrt{3} = 1.291$$

to be imaged onto an area of 17.0 mm×13.16 (i.e. a 6 percentage increase in size over the 16.0 mm×12.0 mm image size, to accommodate the manufacturing tolerances). At magnification, $M_{SVGA}$=2.308 the integrator size will be 7.366×5.705 mm Other embodiments and variations of the invention are possible. For example, although the invention has been described in terms of commonly used display formats as of the date of filing this application, the principles of the invention may be extended to resizing between formats which may become popular in the future, without any additional inventive skill. One such emerging display format is UXGA "ultra high" (1600×1200 pixels). All such embodiments and variations are believed to be within the sphere and scope of the invention as defined by the claims appended hereto.

We claim:

1. A pixellated light valve projector with optical image resizing, comprising:

a) an illumination source and optical integrator system for generating a rectangular beam of light according to a predetermined aspect ratio;

b) a pixellated panel for generating a rectangular image in any one of a plurality of native pixel formats;

c) an optical relay system intermediate said optical integrator system and said pixellated panel for automatically concentrating said light onto said image in accordance with said one of said plurality of native pixel formats;

d) a projection screen; and e) a projection optical system for projecting said image onto said projection screen so that the projected image fills said projection screen in accordance with said one of said plurality of native pixel formats while image brightness level is substantially maintained by concentrating said light onto only an image portion of the panel.

2. The pixellated light valve projector of claim 1, wherein etendu of said lamp is matched to a smallest one of said plurality of native pixel formats, said optical relay system is zoomed to illuminate larger images on said panel provided by larger ones of said plurality of native pixel formats, and said projection optical system is zoomed to fill said projection screen with said image.

3. The pixellated light valve projector of claim 2, wherein magnification of said optical relay system (M) is set according to $$M = \frac{f/\text{panel}}{f/\text{lamp}}$$

where f/lamp is the f/# of the illumination source and optical integrator system, and f/panel is the minimum f/# for illumination of the pixellated panel, and wherein magnification of said projection optical system (M') is set according to $$M' = W/P$$

where W is the width of said projection screen and P is the width of said image on said pixellated panel.

4. The pixellated light valve projector of claim 3, wherein said smallest one of said plurality of native pixel formats is SVGA having a pixel format of 800×600 pixels, and wherein said magnification M of said optical relay system is designated as $M_{SVGA}$ and said magnification M' of said projection optical system is designated as $M'_{SVGA}$.

5. The pixellated light valve projector of claim 4, wherein a larger one of said plurality of native pixel formats is XGA having a pixel format of 1024×768 pixels, wherein magnification of said relay optical system is set at $M_{svga}*128\%$, and wherein magnification of said projection optical system is set at $M'_{svga}*78.1\%$.

6. The pixellated light valve projector of claim 4, wherein a larger one of said plurality of native pixel formats is doubled VGA having a pixel format of 1280×960 pixels, wherein magnification of said relay optical system is set at $M_{svga}*160\%$, and wherein magnification of said projection optical system is set at $M'_{svga}*62.5\%$.

7. The pixellated light valve projector of claim 4, wherein a larger one of said plurality of native pixel formats is NTSC video having a pixel format of 1280×1024 pixels, wherein magnification of said relay optical system is set at $M_{svga}*165\%$, and wherein magnification of said projection optical system is set at $M'_{svga}*62.5\%$.

8. The pixellated light valve projector of claim 4, wherein a larger one of said plurality of native pixel formats is EWS having a pixel format of 1280×1024 pixels, wherein magnification of said relay optical system is set at $M_{svga}*165\%$, and wherein magnification of said projection optical system is set at $M'_{svga}*62.5\%$.

9. The pixellated light valve projector according to claim 1, wherein said predetermined aspect ratio of the optical integrator is $\sqrt{5}:\sqrt{3}$, resulting in a 3% overfill of said panel by said light when said one of said plurality of native pixel formats is characterized by an aspect ratio of either 4:3 or 5:4.

10. The pixellated light valve projector according to claim 2, wherein said predetermined aspect ratio of the optical integrator is $\sqrt{5}:\sqrt{3}$, resulting in a 3% overfill of said panel by said light when said one of said plurality of native pixel formats is characterized by an aspect ratio of either 4:3 or 5:4.

11. The pixellated light valve projector according to claim 3, wherein said predetermined aspect ratio of the optical integrator is $\sqrt{5}:\sqrt{3}$, resulting in a 3% overfill of said panel by said light when said one of said plurality of native pixel formats is characterized by an aspect ratio of either 4:3 or 5:4.

12. The pixellated light valve projector according to claim 4, wherein said predetermined aspect ratio of the optical integrator is $\sqrt{5}:\sqrt{3}$, resulting in a 3% overfill of said panel by said light when said one of said plurality of native pixel formats is characterized by an aspect ratio of either 4:3 or 5:4.

13. The pixellated light valve projector according to claim 6, wherein said predetermined aspect ratio of the optical integrator is $\sqrt{5}:\sqrt{3}$, resulting in a 3% overfill of said panel by said light when said one of said plurality of native pixel formats is characterized by an aspect ratio of either 4:3 or 5:4.

14. The pixellated light valve projector according to claim 7, wherein said predetermined aspect ratio of the optical integrator is $\sqrt{5}:\sqrt{3}$, resulting in a 3% overfill of said panel by said light when said one of said plurality of native pixel formats is characterized by an aspect ratio of either 4:3 or 5:4.

15. The pixellated light valve projector according to claim 8, wherein said predetermined aspect ratio of the optical integrator is $\sqrt{5}:\sqrt{3}$, resulting in a 3% overfill of said panel by said light when said one of said plurality of native pixel formats is characterized by an aspect ratio of either 4:3 or 5:4.

* * * * *